Dec. 18, 1923.　　　　　　P. J. BAUR　　　　　1,478,199
BATTER WEIGHING MACHINE
Filed June 19, 1920　　　4 Sheets-Sheet 1

Inventor-
Philip J. Baur.
by his Attorneys

Dec. 18, 1923.

P. J. BAUR 1,478,199

BATTER WEIGHING MACHINE

Filed June 19, 1920

Inventor.
Philip J. Baur.
by his Attorneys-
Howson & Howson.

Dec. 18, 1923.
P. J. BAUR
BATTER WEIGHING MACHINE
Filed June 19, 1920   4 Sheets-Sheet 3
1,478,199
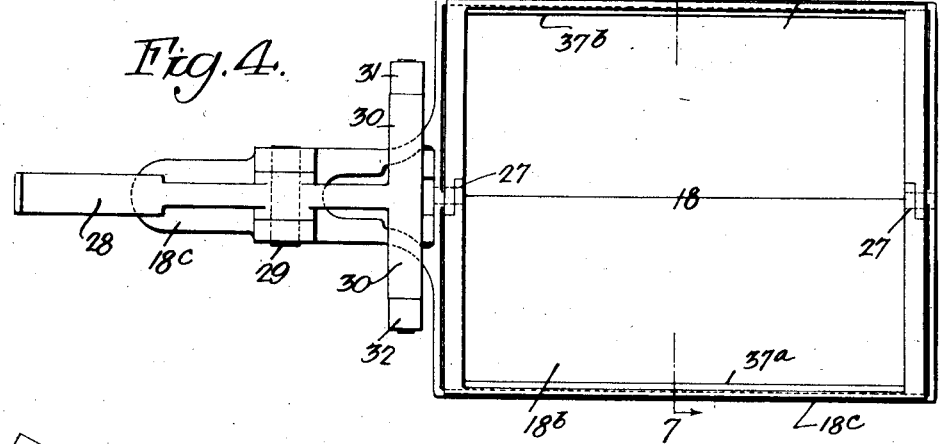
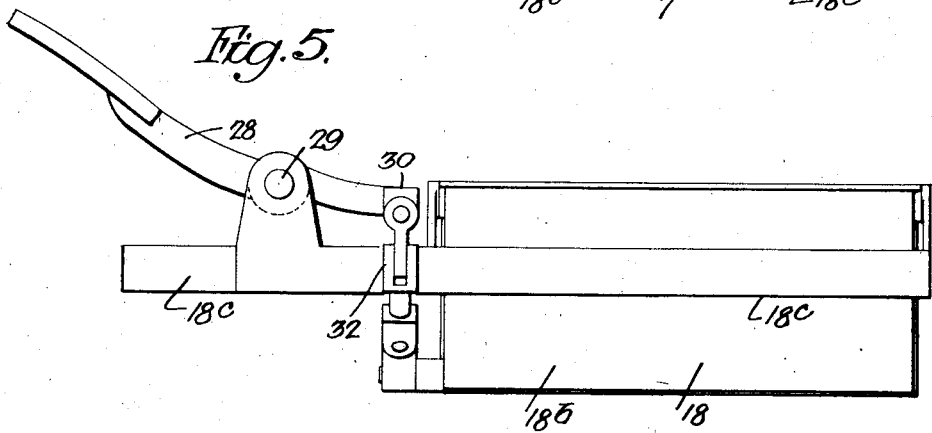
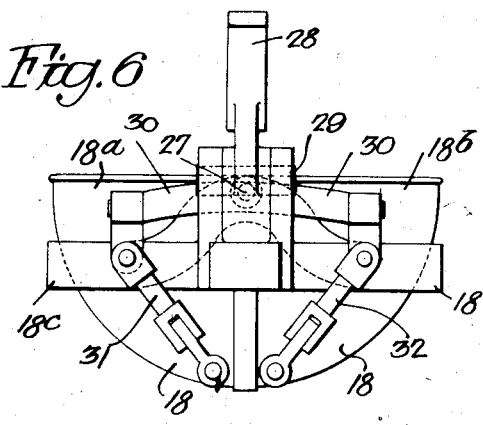
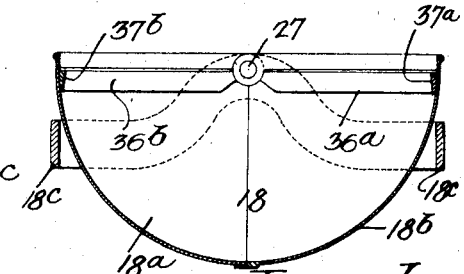
Inventor
Philip J. Baur.
by his Attorneys
Howson + Howson Dec. 18, 1923.
P. J. BAUR
1,478,199
BATTER WEIGHING MACHINE
Filed June 19, 1920
4 Sheets-Sheet 4
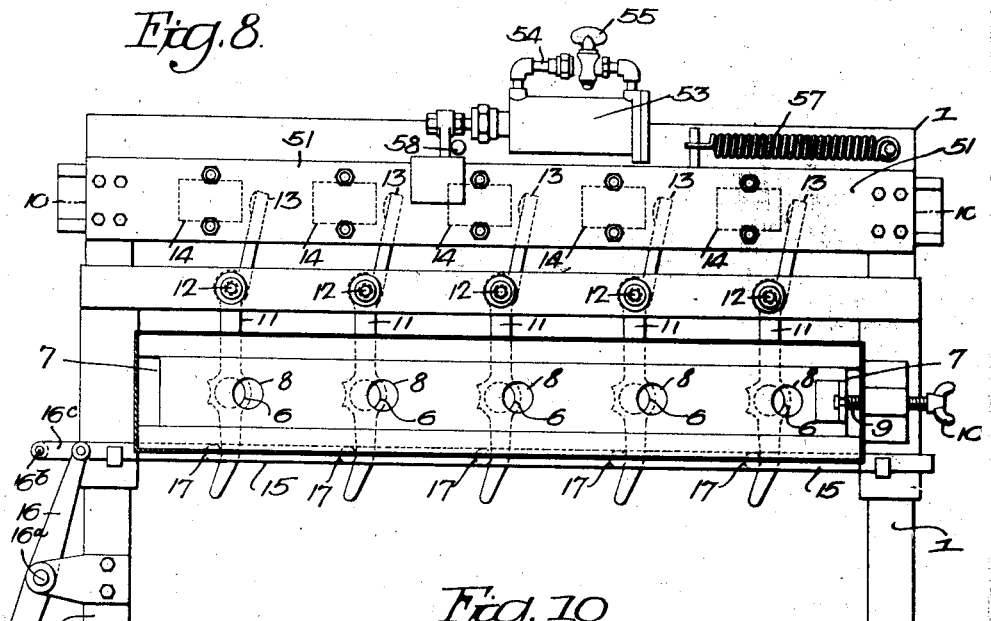
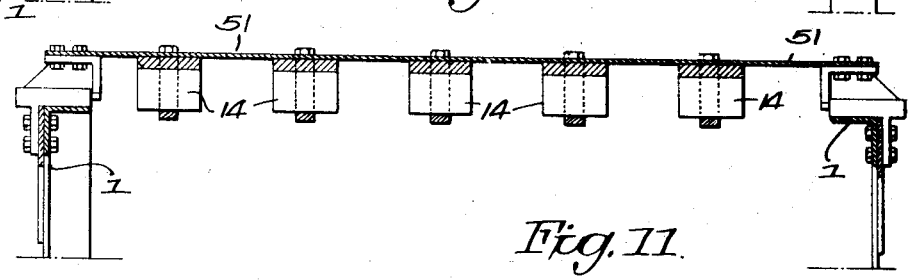
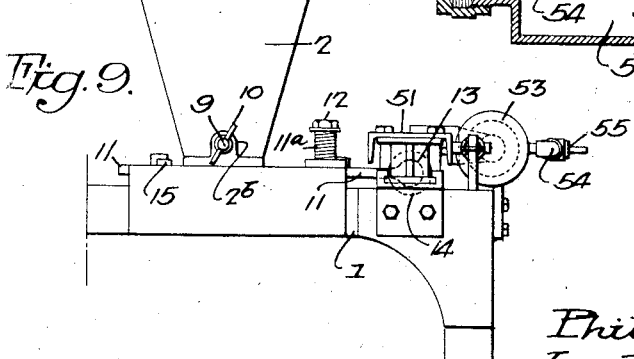
Inventor:-
Philip J. Baur
by his Attorneys
Howson & Howson Patented Dec. 18, 1923.

1,478,199

UNITED STATES PATENT OFFICE.

PHILIP J. BAUR, OF PHILADELPHIA, PENNSYLVANIA.

BATTER-WEIGHING MACHINE.

Application filed June 19, 1920. Serial No. 390,114.

*To all whom it may concern:*

Be it known that I, PHILIP J. BAUR, a citizen of the United States, residing in Philadelphia, Pennsylvania, have invented a Batter-Weighing Machine, of which the following is a specification.

My invention relates to apportioning apparatus, and more particularly to apparatus for measuring and depositing in baking pans predetermined amounts of batter drawn from a suitable receptacle or container.

It is well known that where the batter is manually mixed and placed in the baking pans, it is almost impossible to obtain cakes of any degree of uniformity, since the batter, when mixed by hand, is never of uniform consistency, due to the fact that the air cells in the batter are not evenly distributed through the mass, and there results a natural tendency to obtain cakes of widely variant degrees of quality.

The primary object of my invention is to provide apparatus for automatically apportioning desired amounts of batter to the baking pans, whereby necessity for manually handling the batter between the time when it is made up and the time when the baking has been completed is obviated. A further object is to provide means for depositing in a number of pans exactly equal amounts of batter of uniform consistency, so that the cakes, when baked, will be as nearly uniform as it is possible to make them.

In the accompanying drawings:

Fig. 4, is a plan view of the measuring receptacle;

Fig. 5, is a side elevation of the said receptacle;

Fig. 6, is an end elevation of the said receptacle;

Fig. 7, is a vertical section taken on the line 7—7, Fig. 4; and

Figs. 8, 9, 10 and 11, are views of a modified form of my invention.

Figure 1:
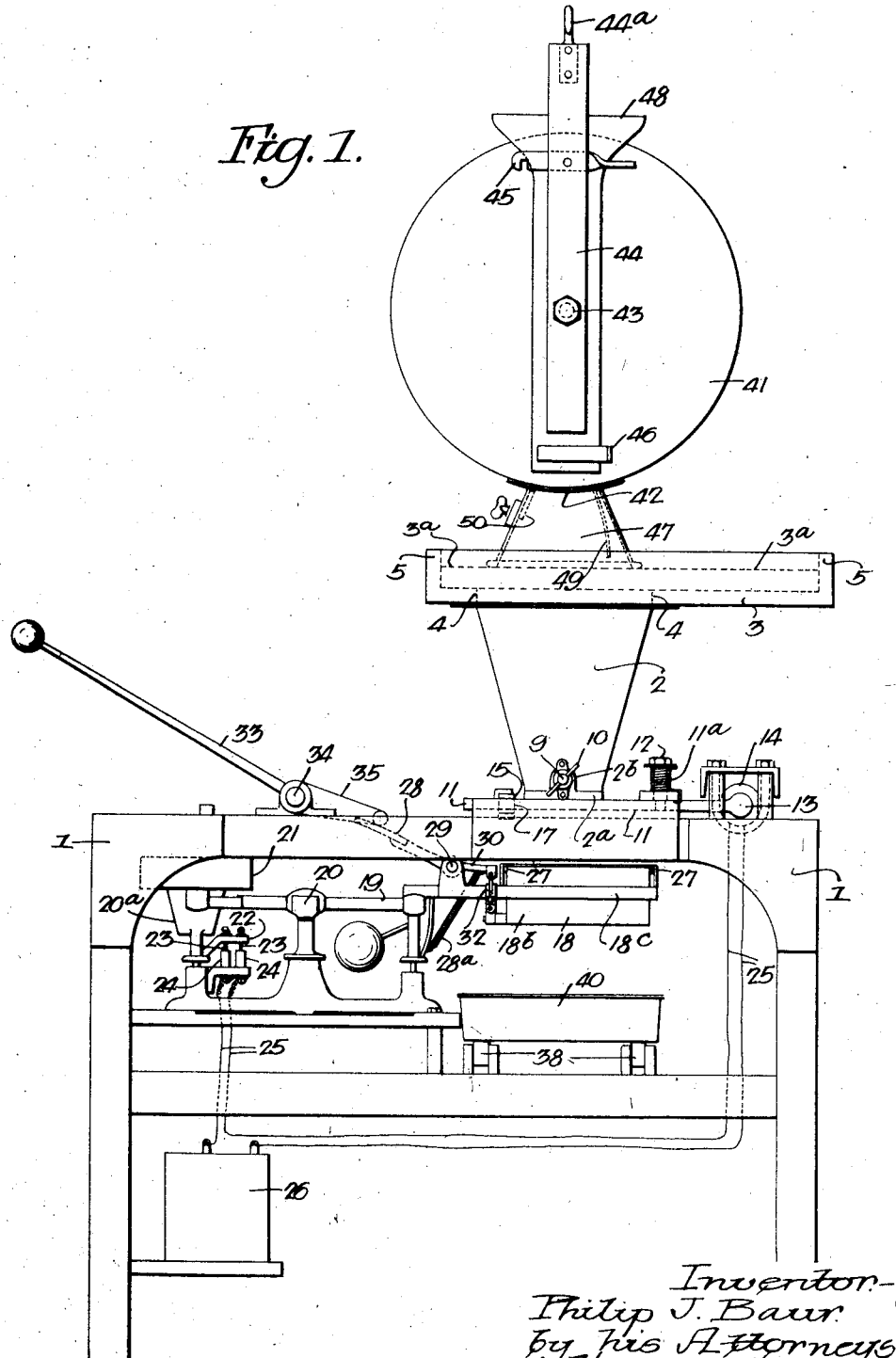
Figure 1, is a side elevation of my apparatus.

With reference to the drawings, my device comprises in its preferred form a frame 1, upon which is mounted a funnel-shaped hopper 2, said hopper in turn supporting a platform 3, having an opening 4 disposed above the top of the said hopper. The platform 3 has side walls 5 which give the platform the nature of a shallow receptacle. The hopper 2 has, at the bottom, a base plate $2^a$ in which is a series of apertures 6, and a plate 7 superposed upon the said base plate and also having a series of apertures 8 therein, which are made to correspond with the apertures 6 in the floor plate is adapted to move over the floor plate to regulate the extent of openings in the base plate, as clearly shown in Fig. 3. The shifting of this plate 7 is accomplished by means of a screw 9, secured thereto but free to rotate, which extends through a correspondingly threaded lug $2^b$ carried by the base plate $2^a$, said screw having a wing nut 10 secured to the outer end whereby the screw may be turned to shift the plate 7 either way, as desired.

Figure 2:
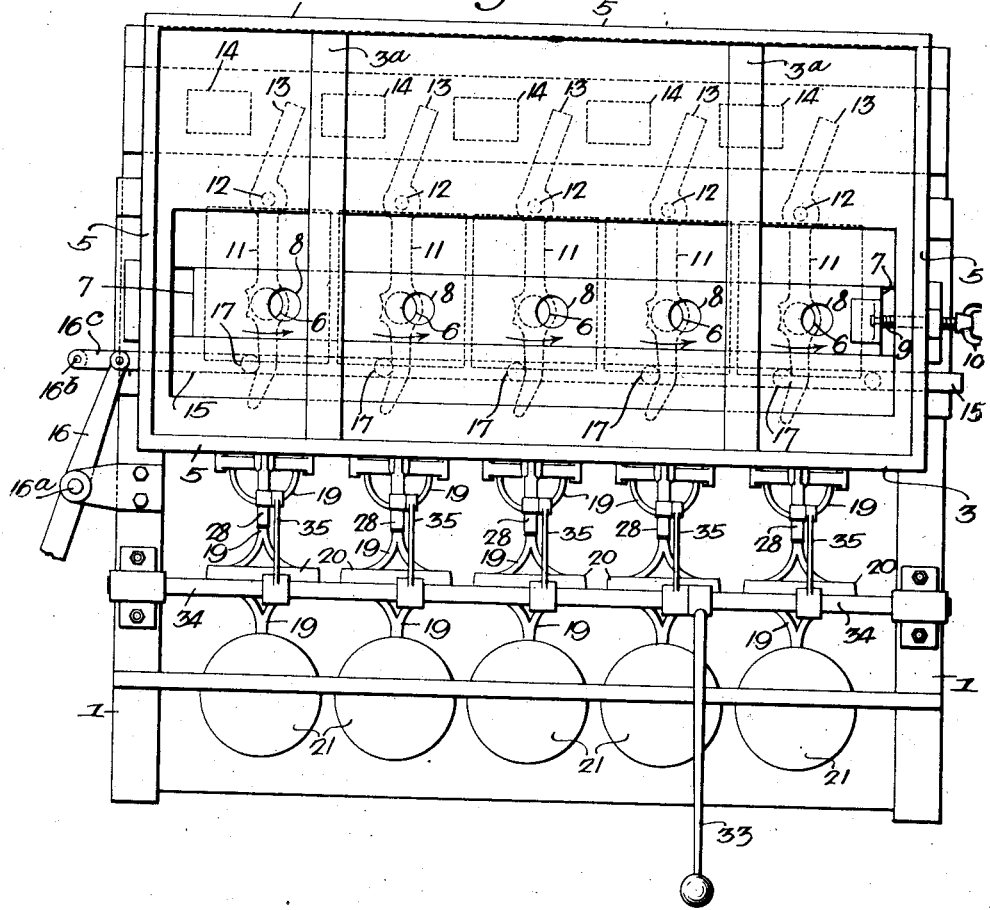
Fig. 2, is a plan view of the apparatus with the container removed.
Figure 3:
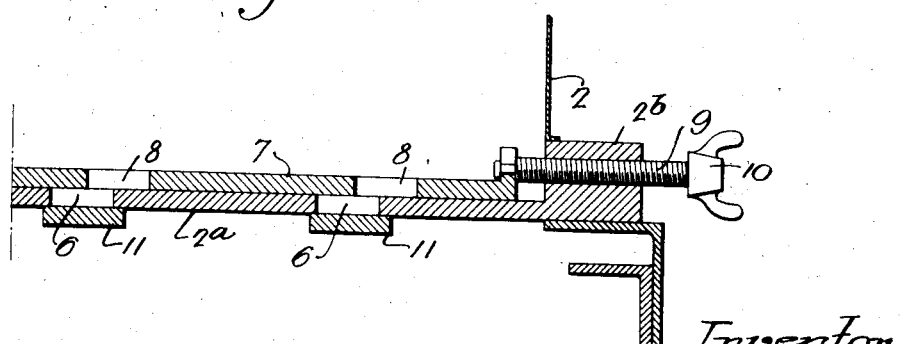
Fig. 3, is a sectional view of a portion of valve regulating device.

Mounted below each of the openings 6 is a pivoted valve arm 11 which normally closes the said openings 6 from below, as shown in Fig. 3. These valve arms 11, 11, are pivoted to the frame at 12, 12, and each has an extension 13 which, when the arms are swung in the direction indicated by the arrows to open the said apertures 6, is adapted to come in contact with one of a series of electromagnets 14, 14. The valve arms 11 are swung simultaneously to positions opening the apertures 6 by means of a bar 15 mounted on the frame and adapted to be shifted longitudinally thereon, the shifting of the bar being accomplished by means of an operating lever 16 pivoted to the frame at $16^a$ and attached to the bar at $16^b$ through the medium of an interposed link $16^c$. The bar 15 carries pins 17, 17, which engage the free ends of the valve levers 11, 11, as most clearly shown in Fig. 2. Springs $11^a$, $11^a$, are attached, one to each of the levers 11 and to the fixed pivot pin 12 thereof in such manner as to tend to hold or return the said levers to the closing position.

Established below each of the apertures 6 in the base plate is a receptacle 18, said receptacle in each case being supported upon a bracket support $18^c$, which in turn is supported by the arm 19 of a balance 20, the weight of the receptacle 18 being counterbalanced by a suitable weight 21 at the other end of the arm 19. The legs $20^a$, $20^a$, that carry the counterweights 21, 21, of the balances each has extending therefrom a lateral arm 22, which carries two contact pins 23, 23, adapted, when the end of the balance to which they are attached is depressed, to enter two cells 24, 24, containing mercury, said cells each being electrically connected by means of wires 25 to a suitable source of electrical supply, such as a battery 26, and to one of the electromagnets 14, 14.

The receptacles 18 are of the clam shell type, and the details thereof are shown in Figs. 4, 5, 6 and 7. These receptacles are divided into two half sections, 18ᵃ and 18ᵇ, which are adapted to swing upwardly away from each other upon two central pins 27, 27, carried by the bracket support 18ᶜ, upon which pins the sections are mounted. The opening of these buckets is accomplished, in the present instance, by means of a lever 28, one of which is pivoted to each of the supports 18ᵃ, 18ᵃ, at 29, 29, and each having a yoke 30 attached to the inner end thereof. From the outer ends of the yoke 30, links 31 and 32 extend respectively to each of the sections 18ᵃ and 18ᵇ of the receptacles. When the outer free end of the lever 28 is depressed, the yoke 30 is raised and the two sections of the receptacle are pulled outwardly and upwardly away from each other at the bottom around the pins 27, 27, as already described. A spring 28ᵃ tends to retain the receptacles in closed position.

An operating lever 33 attached to a shaft 34 mounted in the frame and having arms 35, 35, adapted to engage the levers 28 of the respective receptacles 18 provides means for opening the said receptacles simultaneously. Each of the sections 18ᵃ and 18ᵇ of the said receptacles has arms 36ᵃ and 36ᵇ respectively, rigidly attached to the pins 27, 27, said arms 36ᵃ and 36ᵇ extending across the top of the receptacle at the ends thereof and having scraper bars 37ᵃ and 37ᵇ respectively attached to the outer ends thereof, said scraper bars being adapted to pass over the inner surface of the sections as they are opened so as to scrape the insides clear of the batter which may adhere thereto. Below each of the receptacles is a suitable stand or support 38 for a receptacle, such as a baking pan 40 or the like.

The apparatus herein described and illustrated comprises five separate balances. These balances are exactly similar in all respects and operate entirely independently of each other. Each balance has a corresponding valve in the base of the common hopper 2, and each balance is provided with independent means for governing the length of time that the valve is left open for the discharge of the batter into the balance receptacle. It is to be understood, however, that the invention is not limited to apparatus having any specific number of balances or measuring instruments, nor to the particular method of operation herein described.

The platform 3 has two cross pieces 3ᵃ, 3ᵃ, extending from side to side which are adapted to support a tank or container 41 which supplies the batter to the hopper 2. The container 41 is adapted to be removed from the platform to receive a fresh supply of batter when required, and for this purpose the tank, which is cylindrical in the present instance, is provided with a device which permits inverting the same so that the single opening 42 may be used both as an inlet and a discharge opening. The tank has trunnions 43 at the ends, and pivotally mounted on these trunnions at each end is an arm 44, 44, each having a hook 44ᵃ at the outer end. A retaining hook 45 is carried by one of the arms 44 intermediate the outer end thereof and the trunnion, said hooks being adapted to engage a bracket or lug 46 upon the tank to retain the tank in upright position after it has been turned from the inverted position shown in Fig. 1. A funnel-shaped member 47 is attached to the container at the opening 42, said member acting as a funnel or hopper to guide the batter into the container, and also as a support for the container upon the platform 3. When the said member 47 is in the receiving position, the container is supported by legs 48, 48, attached at opposite ends thereof.

A door or trap 49 is secured to the tank and is adapted to close the opening 42 when desired, a lock or catch 50 being provided for retaining the door in closed position, shown in Fig. 1.

The operation of the apparatus is as follows:

The container 41 being filled and in the position shown in Fig. 1 in which the opening 42 therein lies above the mouth of the hopper 2, the door 49 is released and the batter flows into the hopper. When the hopper is full, the batter overflows onto the platform 3, and when the batter on the platform has risen to the extent of covering the mouth of the funnel 47, it acts as a seal, prohibiting the inflow of air into the tank, and the flow is therefore cut off until the surface of the batter sinks below the mouth of the funnel, when the flow is automatically resumed.

The operator may open the apertures 6 by swinging over the lever 15, which moves the valve levers 11 clear of the apertures 6 and brings the extensions 13 into contact with the electromagnets 14. Since, as yet, there is no batter in the receptacles 18, the counterbalance weights 21 overbalance the weight of the receptacle, and accordingly the contacts 22 lie within the cells 24, and the electrical circuit is accordingly made, the current passing through the electromagnets and causing them to retain the arms 13 of the levers 11 against their faces, the apertures 6 accordingly being held open after the operator has released the lever 15. When sufficient batter has passed through the apertures 6 into the receptacles 18 to overbalance the counterweights 21, the contacts 23 are withdrawn from the cells 24, and the electrical circuit is broken, whereupon the electromagnets 14 immediately release the arms 13, and the arms 11 are returned to their normal position underlying and closing the apertures 6 by means of the springs 11ª.

Thus it will be apparent that any desired and predetermined amount of batter may be discharged from the container into the receptacles 18, each of the receptacles containing exactly the same amount of batter. By increasing or decreasing the counterweights 21, the amount of batter discharged may be varied.

The operator now throws over the lever 33 whereby the receptacles 18 are opened and the batter contained thereby dropped into the pans 40, one of which is placed on a suitable support directly below each of the said receptacles 18. The pans 40 are then removed to the ovens and are replaced by empty pans, the entire operation being repeated.

The advantages in the use of this device are many. Aside from the element of time saving and cleanliness, there is the fact that the finished products show a great improvement due to the absolute uniformity existing in the separate articles, and the saving due to this uniformity is great, since the number of defective articles is greatly reduced.

It is apparent that the device may be employed for measuring and apportioning materials other than batter and that the construction is capable of many changes in detail and arrangement with no departure from the essential features of the invention.

In Figs. 8, 9, 10 and 11, I have illustrated a modified form of valve mechanism whereby the said valves which control the flow of the batter from the hopper into the various receptacles 18 are closed gradually up to a certain point, the final cut-off being abrupt. The mechanism is in all respects similar to that previously described with the exception that the magnets 14 instead of being fixed are mounted upon a slidable frame 51, the motion of which frame 51 is controlled by a piston 52 operably connected with the said frame and mounted in a cylinder 53. The cylinder 53 is adapted to contain oil or similar substance, of which it is substantially full, and a bypass pipe line 54 having therein a regulating valve 55 extends from one end of the cylinder to the other, as clearly shown in Fig. 8.

Located in the piston 52 is a one-way valve 56 of any suitable construction whereby the piston is able to move one way in the cylinder without acting upon the oil, which passes from one side of the piston to the other through the one-way valve, but when moving in the other direction the piston must force the oil from one end of the cylinder through the said bypass and the regulating valve 55 into the other end of the cylinder. Manipulation of the valve 55 will accordingly regulate the force opposing this latter movement of the piston.

The normal position of the frame 51 is shown in Fig. 8, the said frame being normally held in this position by the tension of a spring 57 secured in suitable manner to the frame 51 and to the fixed frame 1 of the apparatus, further motion of the said frame toward the right being prevented by a suitable stop 58. The operation of this mechanism is as follows:

When the lever 16 is manipulated by the operator to open the said valves, the valve levers 11 are oscillated in the usual manner until the arms 13 thereof strike against the magnets 14, and further movement of the valve levers 11 forces the frame 51 which carries the said magnets to the left. When the valves are completely open and the operating lever 16 released by the operator, the spring 57 carries the said frame 51 back towards the normal position.

The motion of the frame 51 to the left is unopposed by the action of the oil in the cylinder, since the valve 56 permits the oil to pass from the compression side of the piston to the other, but the return motion of the frame 51 is opposed by the pressure of the oil in the cylinder which, as previously described, must be forced through the bypass and through the valve 55 in said bypass to the opposite end of the cylinder as the said frame returns. This return motion under the tension of the spring 57 may be made as slow as desired by regulation of the valve 55.

When the frame 51 has finally returned to the normal position shown in Fig. 8, the magnets still retain the arms 13 of the valve levers, so that the valves are still partially open, and as soon as the receptacles 18 have received sufficient batter to overbalance the weights 21, the magnet circuits will be broken and the valve levers released in the usual manner and carried to the valve-closing position by the action of the springs 11ª.

By means of this modification, the flow of the batter from the hopper 2 is gradually cut off, so that when the valve levers are finally released to close the valve openings there is only a very thin stream of batter passing through the said valve openings. In this manner no excess of batter is permitted to pass from the hopper into the receptacle 18, and by thus regulating the speed with which the frame 51 is permitted to return to the normal position, the amount of batter passing from the hopper 2 to the receptacles can be made extremely accurate.

I claim:

1. In apportioning apparatus, the combination with weighing mechanism, of a hopper established above said mechanism, means for detachably supporting a container above the hopper with the discharge opening of the container below the top of the hopper whereby when the material from the container reaches a predetermined level in the hopper said material closes and seals the discharge opening, a valve in the base of said hopper, means for opening the valve, and means controlled by the weighing mechanism for closing the valve when a predetermined amount of material has passed from the hopper to the weighing mechanism.

2. In apportioning apparatus, the combination with a weighing mechanism, of a hopper established above said weighing mechanism, a valve in the base of said hopper, means for opening the valve to permit flow of the material from the hopper to the weighing mechanism, means governed by the weighing mechanism for closing the valve when a predetermined amount of the material has entered the weighing mechanism, a container supported by said hopper and adapted to discharge material thereto, said container being removable from the hopper and having a single opening therein, a supporting structure from which the container is suspended in transit to or from the hopper, and means for maintaining the container on the structure in an upright or inverted position to permit use of the opening both as an inlet and a discharge opening for the material.

3. In apportioning apparatus, the combination with a container, of weighing mechanism adapted to receive material discharged therefrom, a valve, means for opening the valve to permit discharge of material from the container to the weighing mechanism, mechanism for partially closing the said valve automatically and gradually, and mechanism for abruptly completing the closing of the valve.

4. In apportioning apparatus, the combination with a container, of weighing mechanism adapted to receive material discharged therefrom, a valve, means for opening the valve to permit discharge of the material from the container to the weighing mechanism, a movable member, valve retaining elements carried by said member, and mechanism for shifting said member to effect movement of the valve toward the closing position.

5. In apportioning apparatus, the combination with a container, of weighing mechanism adapted to receive material discharged therefrom, a valve controlling the flow of material from the container, means for shifting the valve to open position to permit discharge of material from the container to the weighing mechanism, a movable member, valve retaining means carried by the member, and means for slowly and continuously shifting said movable member to effect a gradual movement of the valve toward the closing position.

6. In apportioning apparatus, the combination with a container, of weighing mechanism adapted to receive material discharged therefrom, a valve controlling the flow of material from the container, means for opening the valve to permit discharge of material from the container to the weighing mechanism, a reciprocating bar, an electromagnet carried by the bar and adapted to be engaged by the valve when the latter is shifted to the open position and to retain the valve, and mechanism for shifting the said reciprocating bar to effect a movement of the valve toward the closing position.

7. In apportioning apparatus, the combination with a container, of weighing mechanism adapted to receive material discharged therefrom, a valve controlling the discharge of material from the container, means for opening the valve to permit discharge of material from the container to the weighing mechanism, a movable member, valve retaining means carried by said member, mechanism for shifting said member to effect a partial and gradual closing of the valve, means for effecting release of the valve from the retaining means, and mechanism for completing the closing of the valve.

PHILIP J. BAUR.